United States Patent

[11] 3,626,381

[72] Inventors Alexandre Dubinsky
London;
Peter J. Titman, Winchester, both of
England

[21] Appl. No. 867,694
[22] Filed Oct. 20, 1969
[45] Patented Dec. 7, 1971
[73] Assignee International Business Machines Corporation
Armonk, N.Y.
[32] Priority Oct. 23, 1968
[33] Great Britain
[31] 50202/68

[54] PATTERN RECOGNITION USING AN ASSOCIATIVE STORE
13 Claims, 5 Drawing Figs.

[52] U.S. Cl. ........ 340/172.5
[51] Int. Cl. ........ G06k 9/10
[50] Field of Search ........ 340/172.5, 146.3; 235/157

[56] References Cited

UNITED STATES PATENTS

| | | | |
|---|---|---|---|
| 3,167,746 | 1/1965 | Reines et al. | 340/146.3 |
| 3,230,512 | 1/1966 | Seeber et al. | 340/172.5 |
| 3,329,937 | 7/1967 | Lewin | 340/172.5 |
| 3,389,377 | 6/1968 | Cole | 340/172.5 |
| 3,402,394 | 9/1968 | Koerner et al. | 340/172.5 |
| 3,407,386 | 10/1968 | Spanversberg | 340/146.3 |
| 3,430,205 | 2/1969 | Seeber et al. | 340/172.5 |
| 3,533,085 | 10/1970 | Murphy | 340/172.5 |
| 3,348,200 | 10/1967 | Ross | 340/172.5 |

*Primary Examiner*—Raulfe B. Zache
*Assistant Examiner*—Mark Edward Nusbaum
*Attorneys*—Hanifin and Jancin and James Michael Anglin

ABSTRACT: Graphical patterns, such as characters, are represented by sets of binary symmetric numbers (1, −1). An associative store holds a first table of numbers (1, 0, −1) organized into words representing the coefficients of hyperplanes for dividing a pattern space into volumes such that points in the same volume belong to the same pattern class. Each hyperplane representation is contained in a pair of words holding respectively the true and complemented forms of the hyperplane coefficients. A first associative table look-up determines which word of each pair more closely matches a particular pattern number set, by using the number set as a search argument. The resulting binary number string, indicative of a particular volume in the pattern space, is then used as a search argument for a second table in the store. The second table is organized into words representing each individual volume and the name of the pattern associated with that volume. An exact match on the second table look-up thus produces an output indicative of the name of the pattern to be recognized.

INVENTORS.
ALEXANDRE DUBINSKY
PETER J. TITMAN
BY
ATTORNEY

PATTERN RECOGNITION USING AN ASSOCIATIVE STORE

This invention relates to a method and apparatus for recognizing a character form when the character form is represented by a set of $d$ binary symmetric numbers, i.e., numbers which can take only the values 1 or −1.

As will be explained, the problem of recognizing a character form represented by a number set is the problem of assigning the numbers set to a class which contains all number sets representing the same character, or, expressed otherwise, the problem of classifying the number set.

According to the invention, a method of classifying a set of $d$ binary symmetric numbers using at least one associative digital data store comprises loading an associative store with a first table of which the entries represent the coefficients, restricted to a range of values 1, 0 and −1, of planes in $d$—space which divide the space into volumes such that substantially all points in the same volume representing binary symmetric numbers belong to the same class, loading an associative store with a second table of which each entry defines a volume by means of a label set which specifies on which side of each plane included in the first table any point of the volume is located, determining by means of a first table-look-up operation on the first table on which side of each plane is located the point which represents the set of numbers being classified, and using the result of the first table-look-up operation in a second table-look-up operation on the second table to determine the volume in which the said point lies, and thereby the class to which the number belongs.

The invention also comprises apparatus for performing the above method.

The invention will be further explained, by way of example, with reference to the accompanying drawings, in which.

Figure 1:
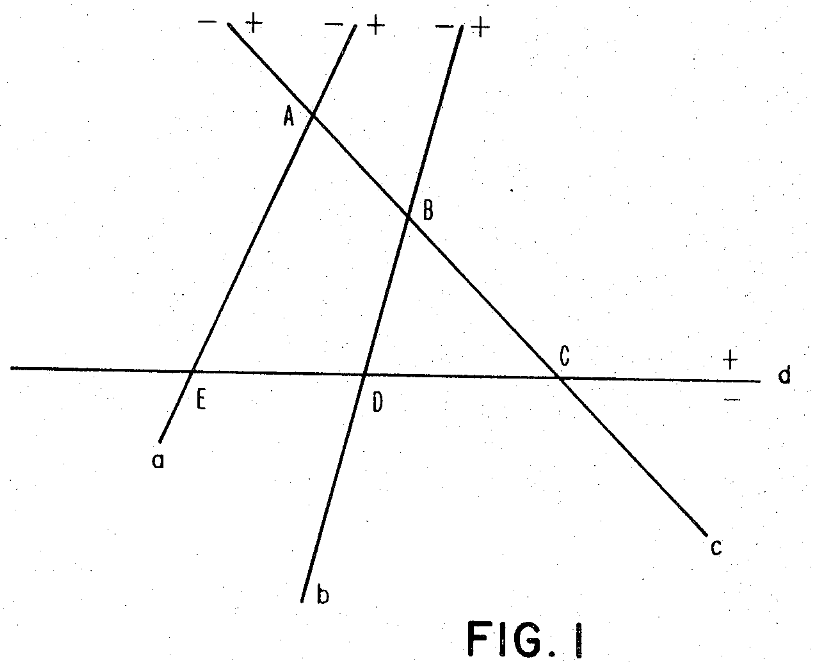
FIG. 1 is a diagram illustrative of the theory of the method according to the invention.

It is well known that a character can be represented by an ordered number set of $d$ digits. For example, let the image of a character fall on a rectangular array of $d$ photodetectors. If a photodetector is masked by the character, let the resultant state of the photodetector be represented by the number 1; otherwise, let the resultant state of the photodetector be represented by the number 0. Then the number set $(b_i)$, $b_i$=1 or 0, $i$−1 to $d$, is a representation of the character which is imaged on the photodetectors. There is clearly no loss of generality in representing the states of a photodetector by the binary symmetric values 1, −1.

The problem of recognizing the character is the problem of assigning to the character a label—a class name—and this is equivalent to assigning the number set representing the character to a class. In an ideal situation each class has only one member so that a given character gives rise to only one number set which is immediately assignable to its class. In practice the ideal situation does not exist. Even the characters on a printed page are not printed evenly due to differential absorption of ink by different areas of paper, and the recognition of handwritten characters is an application where it is clear that a single class will comprise a great many different number sets.

Consideration of the latter application leads to the conclusion that the key problem of character recognition is the determination of the scope of the classes. The problem has been approached, or rather bypassed, by designing special fonts in which characters are distinguishable even when quite severely mutilated.

E. M. Braverman in a paper "Experiments in Machine Learning to Recognize visual Patterns," Automatika *i* Telemekhanika, Vol. 23, No. 3, March 1962, (Translation published Sept. 1962) has proposed an algorithm for machine learning to distinguish visual patterns.

A number set of $d$ digits is considered as identifying a point in space of $d$ dimensions. The machine is presented with a training group of number sets each belonging to a known class and draws hyperplanes (hereinafter referred to as planes) separating the space into volumes each containing all (or in practice, most of) those points belonging to the same class. At the end of training, number sets to be classified are presented to the machine. By determining on which side of each plane the point which represents a number set lies it is found in which volume of space the point is situated and therefore the class to which the number set belongs.

The Braverman algorithm is of great generality and depends for success only on the classes being "compact" which means that not too many points of a class intermingle with points of other classes thereby preventing the drawing of planes which separate classes sufficiently. In a particular case it may be difficult to determine a representative training set, but this does not detract from the generality of the theory.

The equation of a plane passing through the origin of a space of $d$ dimensions is given by $$w_1 x_1+w_2 x_2+...+w_d x_d=0 \qquad (1)$$

In order to separate two points known to belong to different classes, Braverman generates $d$−1 of the coefficients $w_i$ by a pseudorandom number sequence and then calculates the last coefficient.

It has been found that, by restricting the number field to which the coordinates $x_i$ belong the the binary symmetric field (−1, 1) (in the example given, representing an unmasked photodetector by −1), and by choosing each separating plane so that it consists of all points equidistant from the points being separated, the calculations are much simplified and character recognition can be performed by only two table-look-up operations on an associative store.

In fact, if the two points are $(Y_i)$ and $(y_i)$, $i$=1 to $d$, the equation of the plane comprising all points equidistant from the two points is $$\sum_{i=1}^{d} w_i x_i = \sum_{i=1}^{d} \tfrac{1}{2}(Y_i - y_i) x_i = 0$$

from which it is clear that the coefficients $w_i$ can take only the values −1, 0 or 1.

In order to determine on which side of the plane (1) a point lies the coordinates of the point are substituted for the $x_i$ in the left-hand side of (1). THe evaluated result can be a positive or negative number or zero. All points whose coordinates give rise to results of the same sign lie on the same side of the plane, or to express the idea differently, the sign of the evaluated result indicates the side of the plane on which a point lies.

Due to the limits imposed on the coefficients $x_i$ and $w_i$, the evaluation of each term of (1) involves (a) a multiplication of +1 by +1 or − 1 by −1 ;

or (b) a multiplication of +1 by −1;

or (c) a multiplication by zero ($w_i$=0).

The operation (c) contributes nothing towards determining the sign of the expression which may be found simply by counting the respective numbers of times the operations (a) and (b) have to be performed and noting which number is the larger. If (a) is done the more often, the sign is positive; if (b) is done the more often, the sign is negative.

The evaluation can be made in one search operation using a modification of the associative store described in the specification accompanying our copending commonly owned application, Ser. No. 825,455. The store is such that the degree of mismatch of a search argument with the contents of a register is represented by the quantity of current on a mismatch conductor associated with the register. THe data storage cells of which the word registers are comprised can take three stable states called 1, 0 and X, the X state being such that no mismatch signal is generated by a cell in the X state whatever the interrogation signal may be. Each order of the search argument is binary and can lead to the generation of a 1 interrogation signal or a 0 interrogation signal. The number set representing a point in space of $d$ dimensions is used as the search argument. If a member of the set has the value 1, a 1 interrogation signal is applied to the word registers of the store, and if a member of the set has the value $-1$, a 0 interrogation signal is applied to the word registers of the store. The word registers are used to store the coefficients $w_i$, the value 1 being represented by the data cell stable state 1, the value $-1$ being represented by the stable state 0, and the value 0 being represented by the stable state X.

In a first word register of the memory are stored the true values of the $w_i$ and in a second work register are stored the complements of the $w_i$, it being defined that the complement of 0 is 0, of 1 is $-1$, and of $-1$ is 1. If a mismatch occurs between an order of the search argument and the contents of a storage cell, one unit of current is directed from the cell onto the mismatch conductor. The quantity of current on a mismatch conductor is thus directly proportional to the degree of mismatch between a search argument and the contents of cells of the word register associated with that mismatch conductor. Under these conditions a match operation between a number set $(x_i)$ where the $x_i$ may take the values 1 or $-1$, and the first word register containing the true values of the $w_i$ will give rise to a current on the first word register mismatch conductor which represents the number of times the operation (b) is performed in evaluating the left-hand side of equation (1). A match operation between the number set $(x_i)$ and the second word register containing the complement values, as defined above, of the $w_i$, will give rise to a current on the second word register mismatch conductor which represents the number of times the operation (a) is performed in evaluating the left-hand side of equation (1). A comparison of the currents on the mismatch conductors will then give the sign of the evaluated result. If the current in the first word register mismatch conductor is the greater, the sign is negative. If the currents are equal the result of the evaluation is zero, thus satisfying equation (1) and implying that the point represented by the number set lies on the plane.

As an example, consider the plane in nine-dimension space:

$x_1-x_2-x_3+x_5+x_7-x_8-x_9=0$ (2) The first word register will contain the following entries:

+1 −1 −1 0 +1 0 +1 −1 −1 and the second word register will contain the following entries:

−1 +1 0 −1 0 −1 +1 +1. Take the number set (1,−1,−1,1,1,1,1,1,−1) (3)

and match it with the contents of the first and second registers. In the terms of the above-described stable states 0,1 and X, the above groups will be represented as:

First word register: 1 0 0 X 1X 1 0 0
Second word register: 0 1 1 X 0 X 0 1 1
Input number set: 1 0 0 1 1 1 1 1 0

The number of mismatches with the contents of the first register is one; giving rise to one unit of current on the first register mismatch conductor. The number of mismatches with the contents of the second register is six, giving rise to six units of current on the second register mismatch conductor. The point in nine-dimension space represented by the number set (3) is situated on the positive side of the plane (2), in the sense that it is a member of that set of points which give a positive value when their coordinates are substituted for the $x_i$ on left-hand side of equation (2). As a check, substituting the number set (3) in the left-hand side of equation (2) gives:

1+1+1+1+1+1−1 which is positive.

Having determined on which side of each plane a point lies, the volume of space in which the point lies can readily be found by a single-matching operation. For it is clear that each bounded volume is uniquely specified by listing on which side of each plane the volume is situated. This is illustrated in FIG. 1 for a space of two dimensions in which the "planes" are lines $a$ to $d$, and the "volumes" are areas. Each plane divides the space into two half-spaces lying on the positive and negative sides of the line respectively. If a volume is situated in the positive half-space, let the volume be labeled 1; if situated in the negative half-space, let the volume be labeled 0. Points in the plane will be considered to be situated in the positive half-space. The volumes are labeled with respect to each of the planes thereby uniquely specifying each volume. In FIG. 1, the volume ABDE is specified by the label set (1,0,0,1), the bounded volume BCD by the label set (1,1,0,1). It follows that, by comparing the results of the first operation, which found on which side of each plane a point lies, with the label sets of all the volumes it can be found in which volume the point lies and therefore to which class the number set represented by the point belongs. This comparison can be done in a single-matching operation in a associative store.

Figure 2:
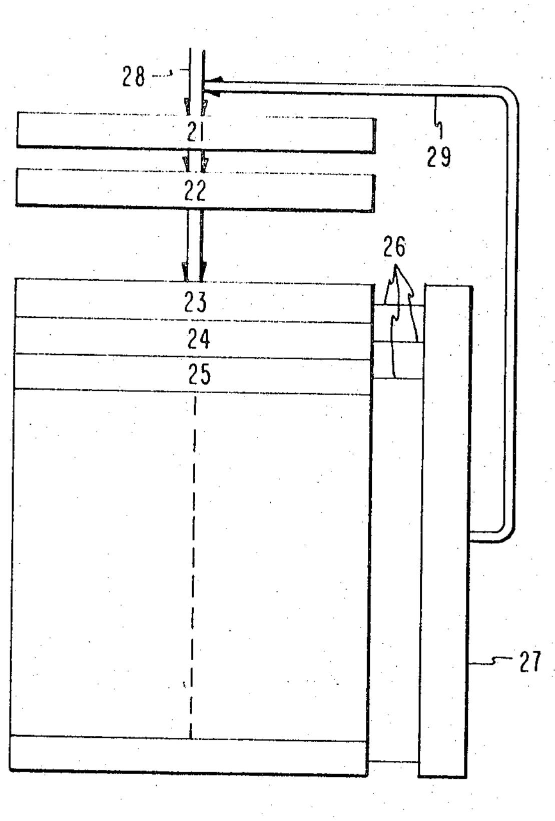
FIG. 2 is a block diagram of an associative store adapted for performance of the method according to the invention.

There will now be described an associative store suitable for performing the method hereinbefore disclosed. Referring to FIG. 2, the associative store 20 comprises an input/output register 21, a mask register 22 and a plurality of word storage registers 23, 24, 25..... Each word register has a mismatch line 26 which provides an input to match logic 27. A bus 28 comprising a plurality of conductors provides the means whereby data is transferred to or from the input/output register 21. An output bus 29 from match logic 27 is connected to bus 28. As in a conventional associative store, the contents of certain fields of the input/output register 21 are compared with the contents of the same fields of the word registers 23, 24 ...... . Those registers which do not, as a result of the match operation emit current onto the mismatch line 26 are said to be selected and a selector trigger (not shown, but forming part of match logic 27) associated with each such register is set, thereby marking the register for a subsequent accessing operation. The fields which are compared are dependent on the setting of the mask register 22 which is selectively settable by conventional means (not shown) to mask any order of the input/output register 21 from the word registers. Each word register of the associative store comprises bit storage cells 41 (FIG. 4) each consisting of two bistable circuits and thus having four possible stable states, of which only three are used in the application being described. Since the cell is fully disclosed in the specification accompanying our copending commonly owned application, Ser. No. 740,939, it will not be described here, save to mention that the three stable states are: binary 1, double-emitter transistor 42 conductive; binary 0, double-emitter transistor 43 conductive; and X or "don't care" state, neither double-emitter transistor conductive. Bit lines 44 and 45 are connected respectively to an emitter of respective transistors 42 and 43, and are used both for transferring data into and out of the cell and for interrogating the state of the cell. When a cell is interrogated voltages are placed on the bit lines so as steer current onto the mismatch line 26 if the cell is not in the state for which it is being interrogated. Thus, if the interrogation is for a binary 1, a low voltage is placed on bit line 44 and a high voltage is placed on bit line 45. IF the cell is in the 1 state, current is flowing in transistor 42 and the low voltage on line 44 draws all this current onto line 44, none appearing on line 26. If the cell is in the 0 state, current is flowing in transistor 43 and the high voltage on line 45 steers all the current onto the mismatch line 26. If the cell is in the X state neither transistor 42 nor 43 is conductive and a mismatch cannot occur. Since the cells 41 are identical in construction, the amount of current flowing in each transistor 42 or 43 is the same and it follows that the amount of current on line 26 is a measure of the number of cells at which mismatch occurred.

Figure 3:
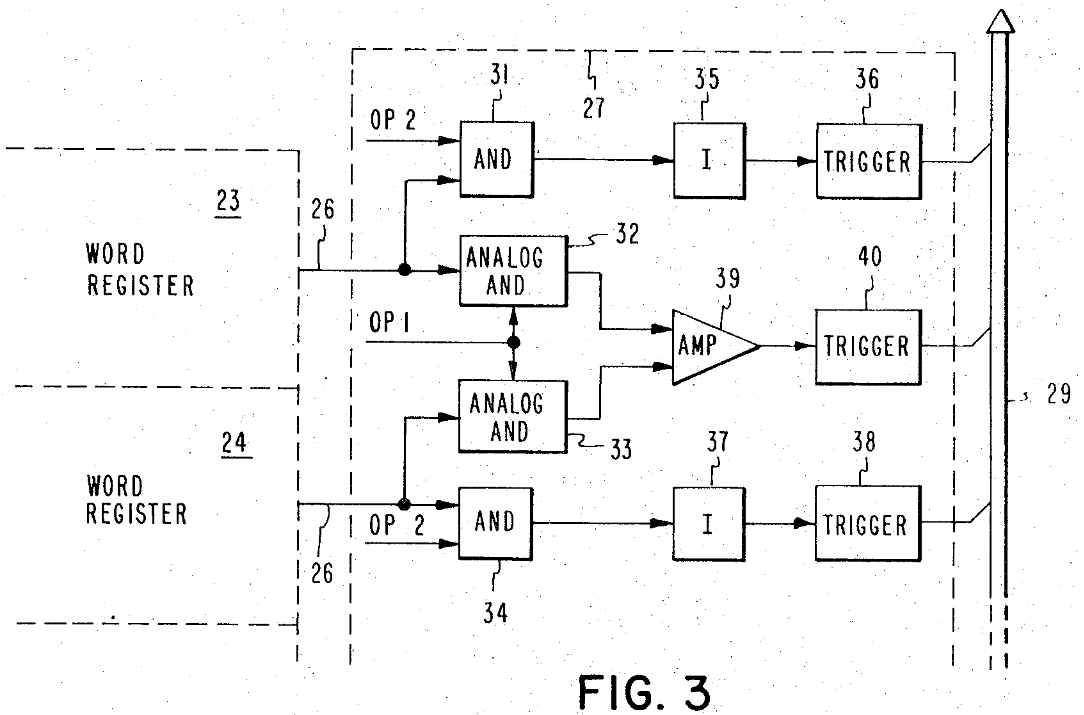
FIG. 3 is a detail of part of the control circuitry for the store shown in FIG. 2.

FIG. 3 shows that part of match logic 27 associated with a typical pair of word registers 23 and 24. The word registers are grouped in pairs for storing respectively the true and complement values of the coefficients of a respective plane, each pair having associated logic identical with that shown and providing one output to bus 29. Mismatch line 26 of register 23 is connected as input to two input AND-circuits 31 and 32.

Mismatch line 26 of register 24 is similarly connected to AND-circuits 33 and 34. The other inputs to AND-circuits 31 and 34 are provided by lines which are energized by a signal OP2, and the other inputs to AND-circuits 32 and 33 are lines which are energized by a signal OP1. AND-circuits 32 and 33 are are not simply logical AND circuits but when activated by the OP1 signal provide outputs which are analogues of the magnitude of the currents on the respective mismatch lines 26 to which they are connected. The outputs of AND-circuits 31 and 34 are applied after inversion by inverters 35, 37 to the set inputs of selector triggers 36, 38 respectively. The outputs of AND-circuits 32 and 33 are applied as respective inputs to a differential amplifier 39. The output of the amplifier 39 is connected to the set input of a trigger 40, the output of which is connected to bus 29. The arrangement of the amplifier 39 and trigger 40 is such that, if the signals emitted by AND-circuits 32 and 33 imply that the current in the mismatch line of register 23 is greater than the current in the mismatch line of register 24, the output of the amplifier is energized and sets trigger 40. Amplifier 39 is biased so that in the case of equal mismatch currents trigger 40 is reset. This is equivalent to including a point in a separating plane in the positive half-space defined by the plane.

To avoid unnecessarily complicating the description, conventional clocking circuits and the means for generating control signals such as OP1 and OP2 have been omitted. Such ancillary circuits may take any of the several well-established forms common to the art of circuit design, as described in, for instance, *Digital Computer Design Fundamentals* by Y. Chu (1962) pp. 392, 393. Typical circuits for analogue AND-(or "analogue switch") circuits 32, 32 are described in, e.g., *Analogue and Hybrid Computers* by Z. Nenadel et al. (1962), pp. 279–281; this reference also shows, at pp. 149–156, the use of a differential amplifier to derive a triggering signal from the comparison of two analogue voltages. U.S. Pat. No. 3,492,470 to G. G. Gorbatenko demonstrates the use of timing signals, comparators and analog switches in a special-purpose capacitive correlator having a large number of discrete levels.

Figure 4:
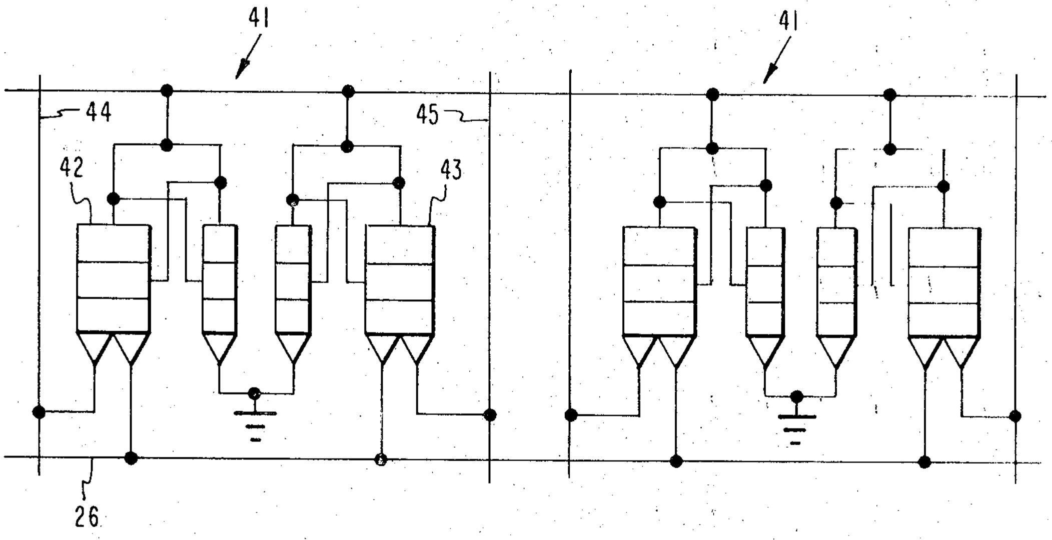
FIG. 4 shows two typical bit storage cells of the store shown in FIG. 2.
Figure 5:
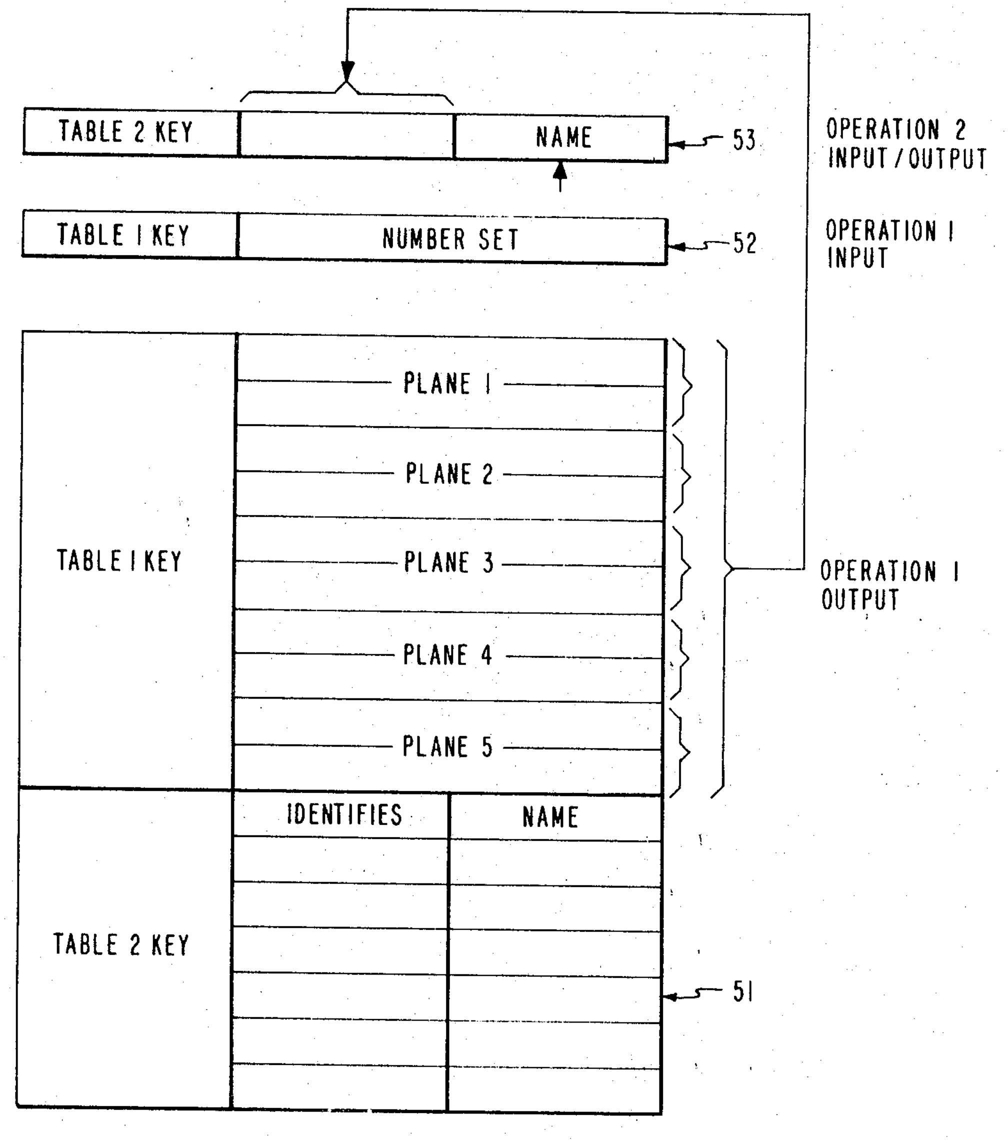
FIG. 5 is a diagram illustrative of the performance of the method according to the invention.

Performance of the method according to the invention on the apparatus of FIGS. 2 to 4 will now be described with reference to FIG. 5 in which 51 is a representation of the contents of the word registers of associative store 20 (FIG. 2), 52 is a representation of the contents of the input/output register 21 during part of the method called Operation 1, and 53 is a representation of the contents of the input/output register during part of the method called operation 2. The word registers contain two tables of data. Table 1 entries each comprise a table identifying key and in respective pairs of adjacent word registers the coefficients $w_i$ of respective planes in true and complement form. It will be recalled that each coefficient may take values 1, 0 or −1, and that cells of the store can assume stable states called 1, 0 and X. The value 1 is represented in table 1 by the state 1, the value 0 by the state X, and the value − 1 by the state 0. Table 2 consists of three fields. Each entry of the table comprises a table identifying key, a volume identifier and the name of the volume represented by the identifier. The volume identifier is a string of binary digits which represent the position of the volume in space relative to the planes. If a volume lies on the positive (negative) side of a given plane, a binary 1 (0) occupies a given order (respective of that plane) of the identifier. The third field in table 2 is the name of each volume and can, if desired, be quite arbitrarily assigned. Different identifiers may have the same name, either because of the requirements of the user, who may wish, for example, to ignore the distinction between upper case and lower case characters, or because the training process has resulted in the same character class being represented by points in different volumes.

During Operation 1, the input/output register is loaded with the table 1 key and the number set representing the character to be recognized. An operation 1 signal is applied to the AND-circuits 32, 33 (FIG. 3) of the pairs of word registers comprising table 1 and simultaneously a match operation of the whole contents of the input/output register with the registers of the associative store is performed. As explained above the degree of mismatch between the contents of the input/output register and the word registers is reflected in the size of the currents appearing on the register mismatch lines. The mismatches in the pairs of registers of table 1 are compared in the differential amplifier 39. If the mismatch in the upper register 23, (FIG. 3) is the greater trigger 40 is set, otherwise, as explained above, it remains reset. The states of the triggers are supplied over bus 29 to the input/output register at the start of Operation 2, and indicate on which side of each plane the point represented by the number set lies.

At the beginning of Operation 2 the input/output register is loaded with the table 2 key and, by way of bus 29, the states of triggers 40. An Operation 2 signal is applied to all AND-circuits 31 and 34 of the associative store and a match operation is performed on the contents of the two fields of the input/output register just mentioned and the same orders of the word registers. Only the table 2 entries will match the table 2 key and only the identifier of the volume to which the point represented by the number set used in Operation 1 belongs will match the second field of the input/output register. Only one register will not emit a mismatch current and will thereby cause trigger 36 (or 38) to be set. By the means described in the aforementioned application, Ser. No. 825,455 or by any conventional means the settings of the triggers 36 (38) are used to select the register which matched the contents of the search argument fields of the input/output register and to transfer the name field of that register to the input/output register.

As a result of Operations 1 and 2, involving only two cycles of the associative store, a character represented by a number set has been named.

In the operation described above, no mention was made of how the circuits 32 and 33 to which the OP1 signal is to be applied, are selected. One method is to include a third input to these circuits which is energized according to the setting of a manually controllable switch. At the end of training, the size of table 1 is made known to the operator by, for example, a print out of the contents of the store. The operator can then choose a switch setting which does not cause the third inputs of the circuits associated with table 2 to be energized. Another method is to do a match operation using the table 1 key at the end of training, which, it should be noted, is not otherwise used directly, as search argument. The triggers 36 (38) of all registers containing table 1 are set and can be used to control subsequent application of OP2 signals, as, for example, by setting gating triggers in the OP2 signal generator.

An alternative method of performing operation 1 is to provide a reversible counter for each pair of word registers 23, 24. THe registers of table 1 containing the true values of the $w_i$ are distinguished from the registers containing the complement values of the $w_i$ are serially compared with the appropriate members of the number set being interrogated. Each time a mismatch occurs the counter associated with the register generating the mismatch is incremented by one. At the end of this part of the operation the counters hold the number of times the operation is repeated on the registers holding the true values of the coefficients, except that when a mismatch occurs the counter associated with the register generating the mismatch is decremented by one. At the end of this part of the operation if the sign of the count held by a counter is positive (negative), the sign of the evaluated expression(1) is positive (negative). The polarity of the count can be used to provide an input for Operation 2 in much the same way that the relative polarity of the mismatch currents in the embodiment described with reference to FIGS. 2 to 5.

Instead of using a single associative store, two stores can be used, the first containing table 1 and the second, table 2. The result of Operation 1 is transferred to the second store while the number set representing a new character is being loaded into the input/output register of the first store. In this way the time taken to identify a sequence of characters is reduced.

What we claim is

1. Apparatus for classifying a set of $d$ binary input digits, said set being representative of a point in $d$-space, into one of a plurality of categories, said apparatus comprising:

means for receiving said set of digits;

means for storing a plurality of groups of ternary digits, each ternary digit being representative of a coefficient of one of a plurality of hyperplanes in $d$-space;

means coupled to said storing means and to said receiving means for comparing said binary input digits with corresponding ones of said ternary digits in each group means responsive to said comparing means for producing a further set of binary digits each having a first value when said point lies on a first side of a predetermined one of said hyperplanes, and having a second value when said point lies on an opposite side of said one hyperplane; and means coupled to said comparing means for producing from said further set of binary digits a label representative of said one category.

2. Apparatus as claimed in claim 1, wherein said storing means comprises a plurality of word-register pairs each operative to contain one ternary-digit group, the value of each digit of one word register in each pair being complementary to that of a corresponding digit in the other word register in said pair.

3. Apparatus as claimed in claim 2, wherein said comparing means comprises;

means for comparing two values of said ternary digits in each word register with respective values of corresponding binary digits in said input-digit set; and means for producing, for each word register, register, a mismatch signal representative of the number of mismatches between said two ternary-digit values and said input-digit values.

4. Apparatus as claimed in claim 3, wherein said means for producing a set of further binary digits comprises means responsive to said mismatch signals for producing said first value of a corresponding binary digit in said further set when the mismatch signal from a first register in an associated word-register pair exceeds the mismatch signal from a second register in said associated pair and for producing said second value of said last-named corresponding digit when the mismatch signal from said second register in said associated pair exceeds the mismatch signal from said first register in said associated pair.

5. Apparatus as claimed in claim 1, wherein said label-producing means comprises:

a further plurality of word registers operative to store representations of said labels such that predetermined addresses are associated with respective ones of said labels; and means responsive to said comparing means for supplying said further set of binary digits to said further word registers as an address, so as to cause said further registers to emit one of said label representations.

6. A method of classifying a set of $d$ binary symmetric numbers representing a point in $d$ space, comprising the steps of;

loading an associative store with a first table, the entries of which represent the coefficients, restricted to a range of value 1, 0, −1, of planes in $d$-space which divide the space into volumes such that points in the same volume represent binary symmetric numbers belonging to the same class;

loading an associative store with a second table, each entry of which defines a volume by means of a label set which specifies on which side of each plane included in the first table any point of the volume is located;

determining, by means of a first table-look-up operation on the first table, on which side of each plane is located the point which represents the set of numbers being classified; and using the result of the first table-look-up operation in the second table-look-up operation on the second table to determine the volume in which the point lies, and thereby the class to which the set belongs.

7. A method as claimed in claim 6, wherein said first table consists of pairs of entries, each pair comprising a first entry in which the coefficients of a plane are represented in true form, and a second entry in which the coefficients of the same plane are represented in inverse form, and wherein said first table-look-up operation comprises determining which of the entries of each pair matches more closely the number set being classified.

8. A method as claimed in claim 7, wherein each entry of said second table has a key comprising the label set and a name represented in digital form, and wherein said second table-look-up operation comprises comparing the results of the first table-look-up operation with the keys and emitting from the store the name in the entry, the key of which is identical to the results.

9. A method as claimed in claim 7, wherein the first table is loaded into a first associative store and the second table is loaded into a second associative store, the first and second table-look-up operations taking place simultaneously in the respective stores in respect of different sets of numbers to be classified.

10. A method of classifying an input set of numbers, each said numbers having one of a plurality of possible values, said method comprising the steps of;

loading an associative store with a plurality of entries, each of said entries containing a plurality of numbers each having one of three distinct possible values;

comparing said set of numbers with said plurality of entries so as to produce a further set of numbers, each number of said further set having a first value when said input set matches a corresponding one of said entries more closely than it matches a predefined word derived from said corresponding entry, and each number of said further set having a second value when said input set matches said predefined derived word more closely than it matches said corresponding entry; and translating said further set of numbers to a code identifying one of a plurality of predetermined classes to which said input set of numbers may belong.

11. A method according to claim 10, wherein said predefined derived word is a complement of said corresponding entry.

12. A method according to claim 10, wherein said associative store is loaded with a further plurality of entries, each entry in said further plurality being said predefined derived word for one of said previously named entries.

13. A method according to claim 10, comprising the further step of loading an associative store with a table containing a plurality of entries each having a label and a value of said identifying code, and wherein said translating step comprises performing an associative search on said table, using said further set of numbers as a search argument.

* * * * *